United States Patent [19]

Takahashi

[11] Patent Number: 5,057,933

[45] Date of Patent: * Oct. 15, 1991

[54] DEVICE FOR PROVIDING AN IMAGE FOR VIDEO RECORDING

[75] Inventor: Keizo Takahashi, Tokyo, Japan

[73] Assignee: Yorica Koki Co., Ltd., Tokyo, Japan

[ * ] Notice: The portion of the term of this patent subsequent to Sep. 19, 2006 has been disclaimed.

[21] Appl. No.: 168,480

[22] Filed: Mar. 15, 1988

[30] Foreign Application Priority Data

Mar. 3, 1988 [JP] Japan .............................. 63-27573[U]

[51] Int. Cl.$^5$ .............................................. H04N 5/76
[52] U.S. Cl. ..................................... 358/335; 358/185
[58] Field of Search ........................ 358/185, 214–216, 358/225, 244–244.2, 332, 335, 345, 348, 906, 909; 352/104; 353/121; 354/80, 292, 293, 295, 354; 355/67, 70, 75, 79, 230, 231

[56] References Cited

U.S. PATENT DOCUMENTS

| | | | |
|---|---|---|---|
| 3,718,760 | 2/1973 | Patels et al. ..................... | 358/225 X |
| 3,951,518 | 4/1976 | Kobayashi et al. ............. | 352/104 X |
| 4,458,270 | 7/1984 | Kuno et al. ..................... | 358/225 |
| 4,616,912 | 10/1986 | Johnsen ................................. | 354/80 |
| 4,632,541 | 12/1986 | Hendrikx ............................. | 355/79 |
| 4,698,683 | 10/1987 | Schwartz et al. ................ | 358/54 X |
| 4,771,343 | 9/1988 | Takenaka ............................ | 358/244 |
| 4,788,600 | 11/1988 | Marsiglio et al. ................... | 358/335 |
| 4,812,904 | 3/1989 | Maring et al. ..................... | 358/80 X |
| 4,868,661 | 9/1989 | Takahashi .......................... | 358/185 |

*Primary Examiner*—Roy N. Envall, Jr.
*Assistant Examiner*—W. R. Young
*Attorney, Agent, or Firm*—Armstrong, Nikaido, Marmelstein, Kubovcik & Murray

[57] ABSTRACT

A device useful in recording a video from a photograph or a movie projector with a superimposed dialogue on a video tape, and projecting the video on a television. The video printer comprises a lens attached to one end of a box for projecting a video, a light source mounted in the box, a holder fixed at the other end of the box for a photograph or a picture, the holder fixing a glass to a frame, a plate detachably attached to the frame for holding the photograph or the picture by the plate and the glass and another holder slidably engaged with the frame for holding an explanation of characters.

5 Claims, 6 Drawing Sheets

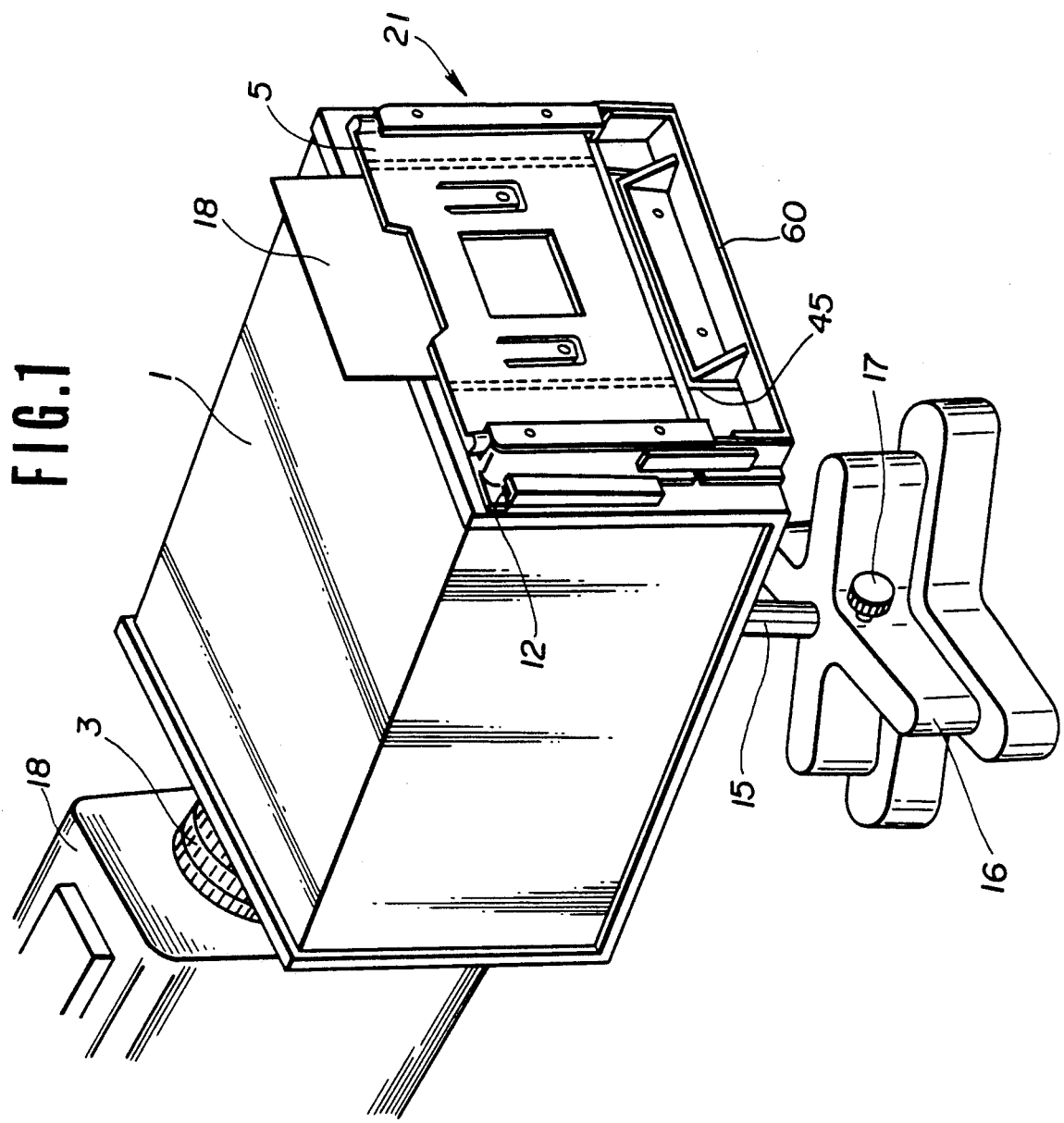

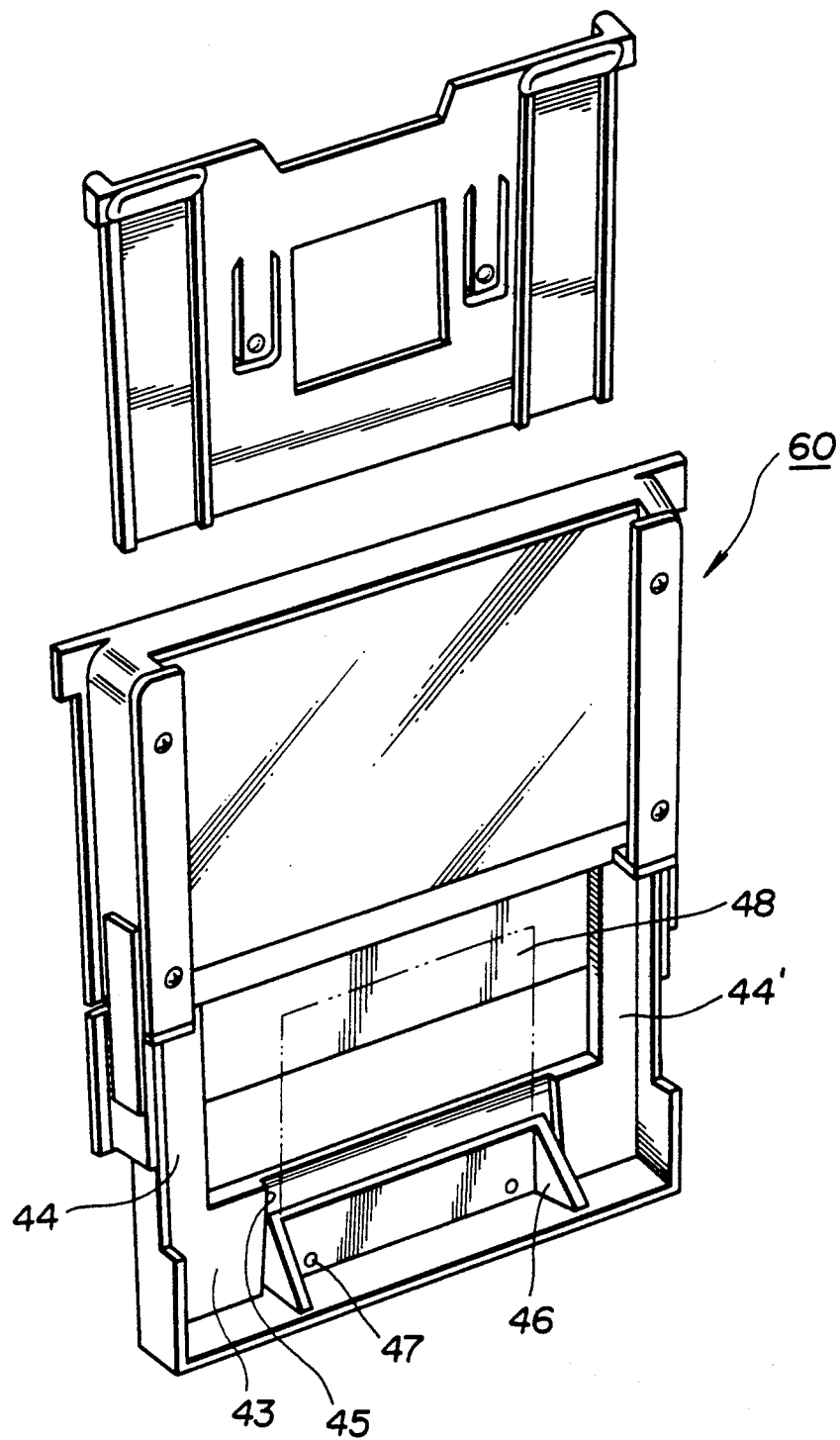

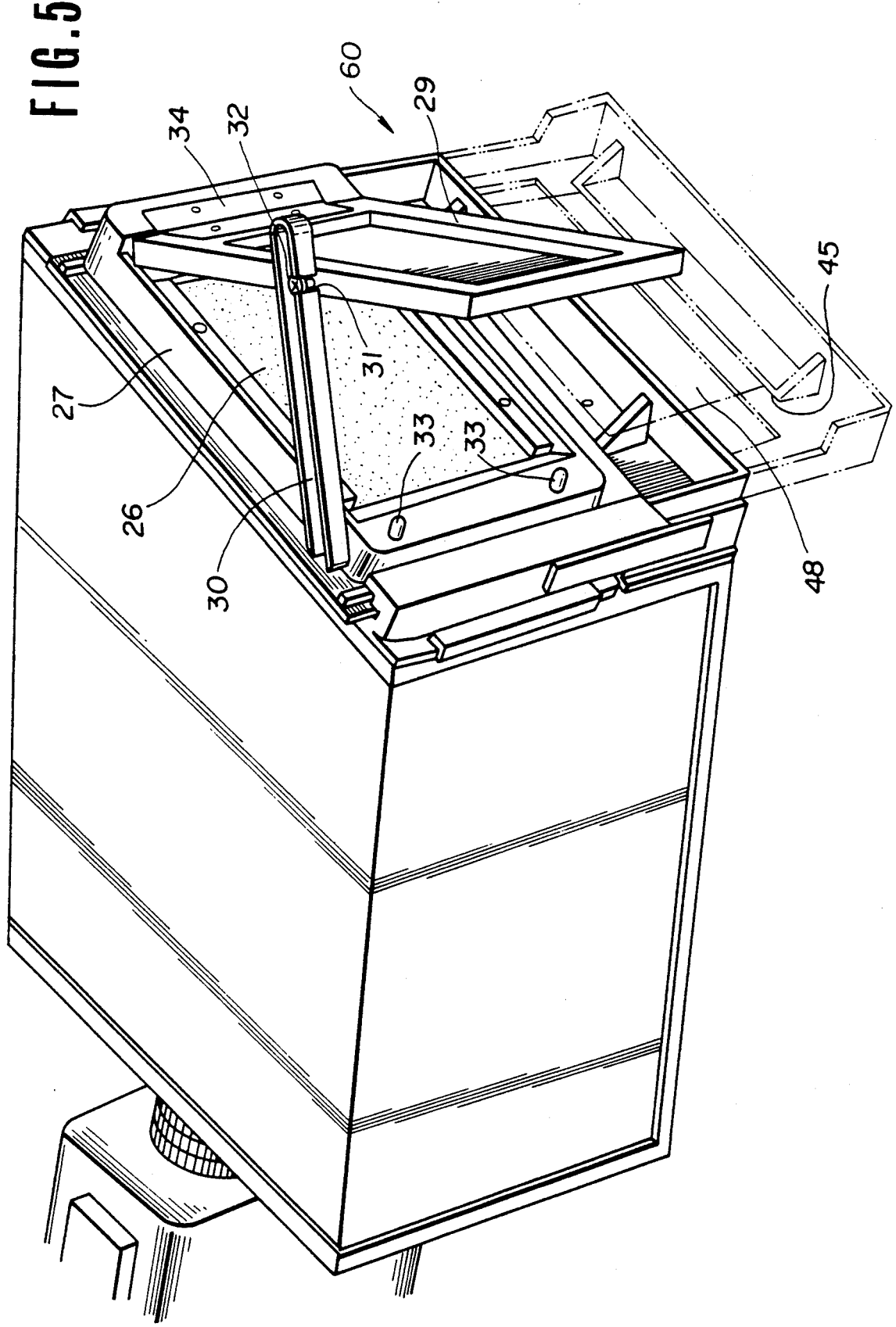

DEVICE FOR PROVIDING AN IMAGE FOR VIDEO RECORDING

BACKGROUND OF THE INVENTION

This invention relates to a video printer adapted to record a video of a photograph or a movie projection with a superimposed dialogue, as required, on a video tape and to reproduce the video on a television for pleasure.

A video printer in which a video is projected in front of a screen by a movie projector, the video is reflected by an internal prism to be projected to a lens of side, and the video is recorded by a video camera on a video tape is heretofore known.

The conventional video printer of this type merely records the video projected by a movie projector on a video tape, but cannot record a photograph or a picture on the video tape.

The present inventor has developed a video printer which can record a photograph or a picture and has previously filed in view of the above-mentioned point in U.S. Pat. application Ser. No. 100,345 filed Sept. 23, 1987, now U.S. Pat. No. 4,868,661.

However, this video printer can record the title of the image by a movie projector, and it is very convenient, but it still has a difficulty of adding a superimposed dialogue to the image.

BRIEF SUMMARY OF THE INVENTION

An object of this invention is to provide a video printer which can eliminates the above-mentioned drawbacks, and which can record both a video projected by a movie projector and a photograph or a picture together with a superimposed dialogue for pleasure on a video tape.

The above and other related objects and features of the invention will be apparent from a reading of the following description of the disclosure found in the accompanying drawings and the novelty thereof.

BRIEF DESCRIPTION OF THE DRAWINGS

FIG. 1 is a perspective view showing video printer to record a photograph or a picture on a video tape;

FIG. 2(A) is a front view of a holder for a photograph or a picture;

FIG. 5 is a perspective view showing how the video by a movie projection is recorded on a video tape.

DETAILED DESCRIPTION OF THE PREFERRED EMBODIMENTS

Figure 2B:
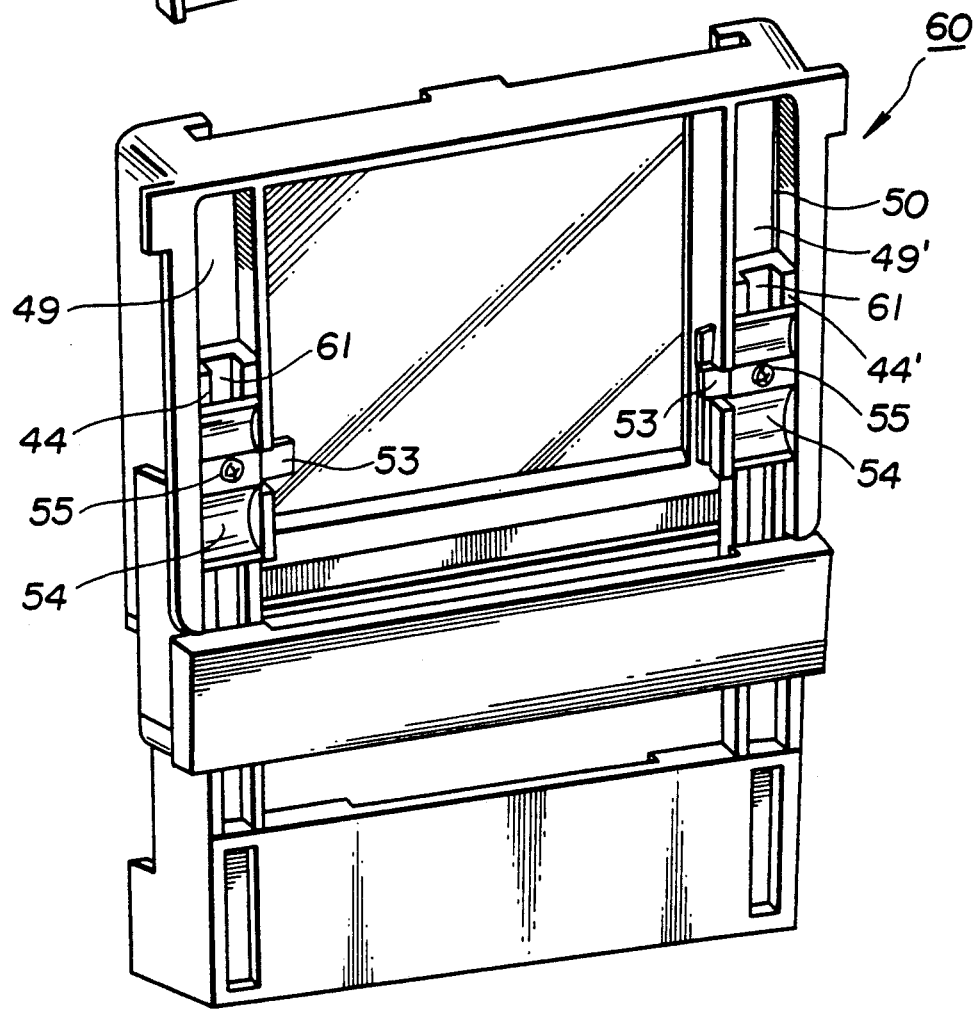
FIG. 2(B) is a back view of a holder for a photograph or a picture.

The constitution of a video printer of one aspect of this invention for performing the above-mentioned object comprises a lens attached to one end of a box for projecting a video, a light source mounted in the box, a holder fixed at the other end of the box for a photograph or a picture, said holder fixing a glass to a frame, a plate detachably attached to the frame for holding the photograph or the picture by the plate and the glass and another holder slidably engaged with the frame for fixing an explanation or characters.

The video printer of another aspect of this invention comprises, additionally to the above, screen means opened or closed at a member having a glass surface and another member having a mirror surface at one end thereof as an axis to be detachably exchangeably attached so that the glass surface is disposed inside for displaying the video projected from a movie projector, detachably engaged in the frame instead of the plate.

A preferred embodiment of this invention will be described with reference to the accompanying drawings.

FIGS. 1 to 4 are perspective views showing an embodiment of a video printer according to the present invention, wherein a lens 3 is attached to one end face of a box 1, and a fluorescent lamp 4 is mounted in the box.

Frame plates 20, 20' of L-shaped section (see FIG. 3) are fixed to both sides of the other end face of the box 1 from lens 3 as to form engaging grooves 12 oppositely between the frame plates 20 on the other end face of the box 1. A holder 21 for a photograph or a picture is engaged detachably with the engaging grooves 12 at both side flanges 40.

The holder 21 for a photograph or a picture is formed by clamping slender plates 13, 13' to both side ends of a frame as to form engaging grooves 25, 25' at both side ends between the frame and the slider plates 13, 13' with bottoms at the lower ends of both side ends of the frame together with a transparent glass plate 2 provided in the holder 21, and a plate 5 can be detachably inserted at both side ends from above downward into the engaging grooves 25, 25' and engaged by a stopper 41 at the upper end of the plate with the engaging grooves. The plate 5 is formed at its central portion with a cutout 6 of square shape for readily detachably inserting a photograph or a picture, and is also formed at both sides of the center thereof with slender U-shaped cutouts 7 to form a retainer pieces 8 for retaining at both sides a photograph or a picture. The retainer pieces 8 are formed to elastically hold the photograph or picture, and projections 9 are formed on both front and back surfaces of the lower end portions of the respective retainer pieces 8 of the plate 5. Slender rod-like members 42, 42' are fixed oppositely an both sides of one of the front and back surfaces of the plate. When the photograph or the picture is small, the plate is so engaged that the surface is directed to the glass surface to insert the photograph or the picture between both the rod-like members 42 and 42'.

Another holder 60 for holding an explanation of characters is composed, as shown in FIG. 2(A), by integrally forming rod-like slides 44, 44' at both sides of the rectangular plate 43. A recess 45 is formed at the center of the rectangular plate 43, the lower surface of the recess is so formed at a step that the lower end thereof is slightly higher than the other, and a holding piece 46 is clamped by a screw 47 to the lower end of the recess to form a holder (recess) 45 for holding the explanation of characters 48 between the holding piece and the recess.

As shown in FIG. 2(B), recessed grooves 49, 49' are formed at both side back surfaces of the holder for the photograph or the picture, and the rod-like slides 44, 44' of the holder for holding the explanation of the characters are elevationally slidably secured to the recessed grooves. Grooves 50 are formed on the outside of the bottoms of the grooves 49, 49', and rolls are mounted in the grooves. Projecting pieces are integrally formed at the rod-like slide outsides of the holder, the projecting pieces are engaged with recessed lower grooves 50 to easily slide the holder in contact with rolls. Small pieces 53 are laterally disposed in both the grooves, leaf springs 54 are clamped by screws 55 to the small pieces 53, and the leaf springs 54 are elastically contacted with the rod-like slides 44, 44' of the holder. Recessed grooves 61 are formed on the sides in contact with the leaf springs 54 of the rod-like slides 44, 44' of the holder, stoppers are laterally provided at the ends of the groove 61, the stoppers are engaged with the screws 55 slightly projected from the small pieces 53, and the holder for holding the explanation of characters is not removed from the holder for the photograph or the picture.

Figure 4:
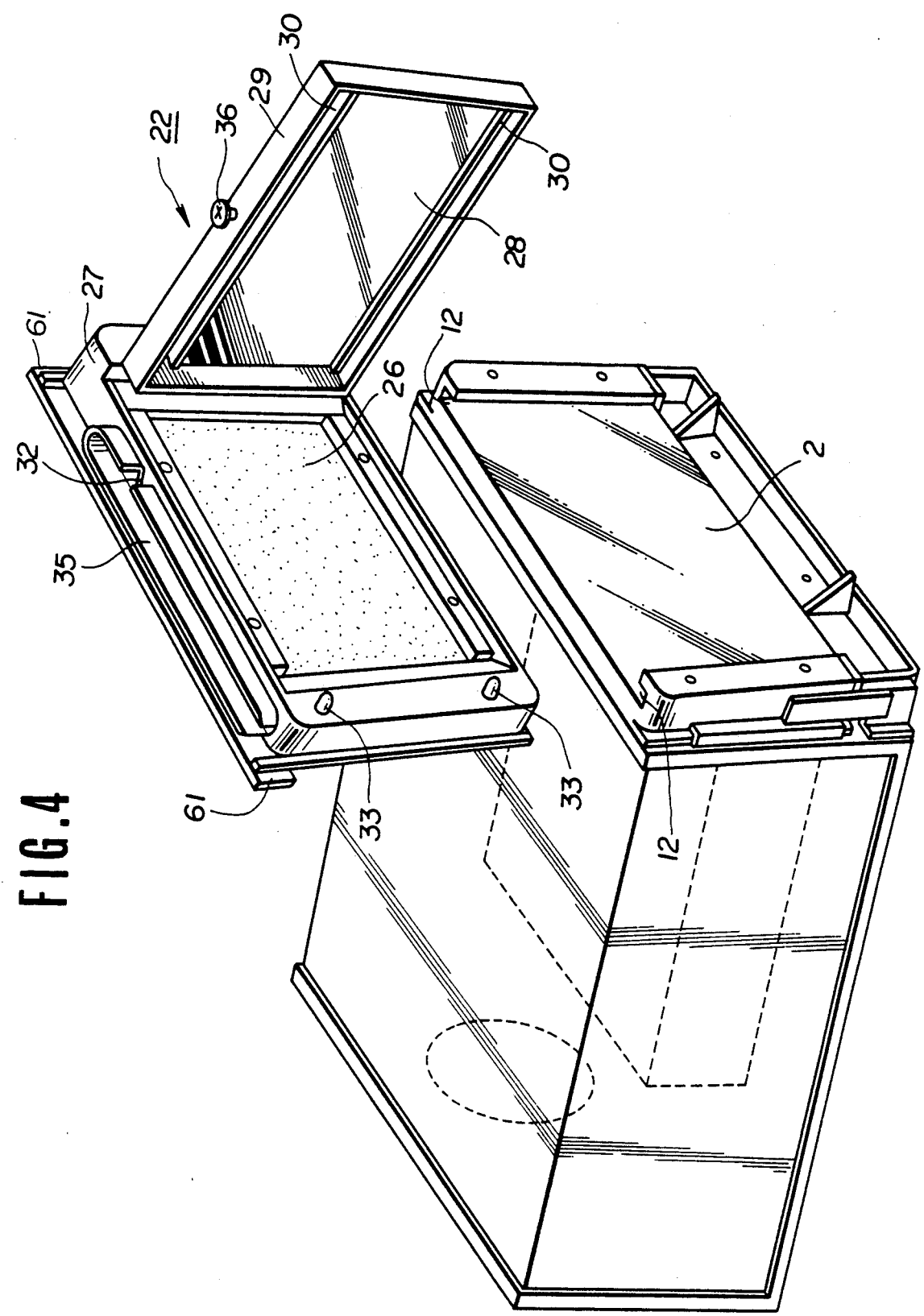
FIG. 4 is a perspective view showing the video printer engaging a screen means.

The screen means 22 for displaying the video projected by a movie projector is composed, as shown in FIGS. 4 and 5, by coupling a frame plate 27 to which a ground glass 26 is attached and a plate 29 on which a mirror 28 is mounted on the inner surface thereof by one or more hinges 34 at one side end thereof to be openably closed so that the mirror face is disposed inside. A projection 33 is formed on the other side end of the frame plate 27 to which the ground glass 26 is attached, and is engaged with grooves 30 formed on upper and lower portions of the mirror surface side of the plate 29 to oppose each other. Reference numerals 35 designate connecting arms having recesses 32 formed at the outer ends thereof to be engaged with projections 36 formed on the upper and lower surfaces of one side end of the plate 29 on which the mirror 28 is mounted such that the frame plate 27 to which the ground glass 26 is attached and the plate 29 are pivotally opened laterally with approx. 45° at the hinges 34 as a pivot.

Figure 3:
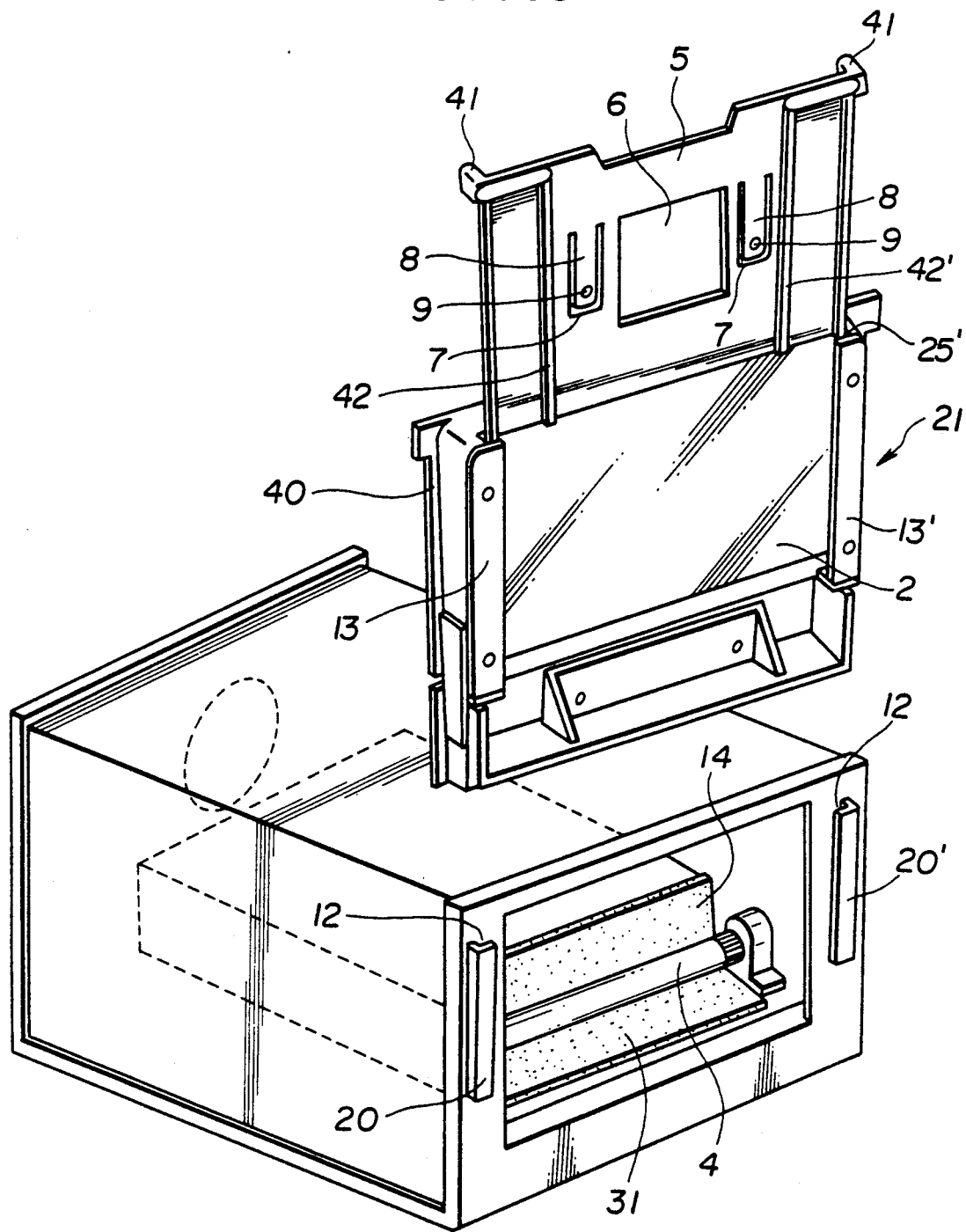
FIG. 3 is a perspective view showing the video printer engaging a holder for a photograph or a picture.

The box 1 is composed therein, as shown in FIG. 3, of a stepped portion 14, and a fluorescent lamp 4 is mounted in parallel with the other end face of the box 1 above the bottom of the stepped portion 14. A reflecting plate 31 made of silver paper in L-shaped section is fixed to the stepped portion 14 to which the fluorescent lamp 4 is attached. This reflecting plate 31 serves to radiate uniform light from the lamp 4 in large quantity to the photograph or the picture inserted to the holder 21.

The fluorescent lamp 4 is turned on by closing a switch, not shown, adapted to be connected to a power source such as a battery mounted on the lower surface of the box 1.

A height adjusting rod 15 is clamped, as shown in FIG. 1, at its upper end to the bottom of the box 1, and engaged at its lower end with legs 16, and the rod 15 can be elevationally movably secured by a screw 17 engaged from the side of the leg 16 to the rod 15.

The operation of the video printer constructed as described above will be described.

As shown in FIG. 1, the holder 21 for a photograph or a picture is slidably inserted at both side ends into the engaging grooves 12 on the other end face of the box 1. A photograph or a picture 18 is inserted between the glass plate 2 and the plate 5, the explanation for the photograph or the picture is inserted to the holder 45, and the rod-like slides 44, 44' of the holder are raised. Then, the switch is closed to light the fluorescent lamp 4. The photograph enlarged through the lens 3 with the explanation is recorded by a video camera 18 on a video tape. When recording a photograph or a picture without explanation, the holder is moved down, and the photograph or the picture is merely recorded on the video tape.

When the video projected by a movie projector is recorded on the video tape, as shown in FIG. 4, the plate 5 is removed from the engaging grooves 35, the screen means 22 for projecting the video by the movie projector is engaged with the engaging grooves 12, and engaged at the upper end flange 61 of the screen means with the engaging grooves 12.

As shown in FIG. 5, the plate 27 to which the ground glass 26 is attached and the plate 29 on which the mirror 28 is mounted on the inner surface are pivotally opened at a suitable angle such as approx. 45°, and the end recesses 31 of the connecting arms 30 are engaged with the projections 32 to be fixed. Then, while a video is being projected to the mirror surface 28 by a movie projector (not shown), the video reflected or transferred to the ground glass 26 is recorded through the lens 3 by the video camera 18 on the video tape. When the explanation is added to the video, the explanation 48 is inserted to the holder 45 in the same manner as described before, the video is reflected on the mirror surface 26 in the state that the rod-like slides 44, 44' of the holder are raised, and recorded in the video camera.

According to the present invention as described above, both a photograph or a picture and a video projected by a movie projector together with the superimposed dialogue or explanation can be recorded on a video tape by very simple video projector to be projected on a television for a pleasure, the video can be explained by both the voice and the superimposed dialogue or explanation. Thus, the video printer can provide entirely novel performance which cannot be seen in the conventional video printer of this type, thereby remarkably improving the value of the video printer.

What is claimed is:

1. A device for providing an image for making a video recording which comprises:
    a box for providing the image,
    a lens attached to one end of the box,
    a light source mounted in the box,
    a first holder secured to the other end of the box and for holding a photograph or a picture, said holder comprising a glass plate fixed to a frame,
    a plate detachably attached to the frame adapted to hold the photograph or the picture between the plate and the glass plate and
    a second holder slidably engaged with the frame for holding an explanation of characters and
    screen means comprising a first member having a glass and a second member having a mirror surface, said second member being pivotally attached to said first member at one end thereof along an axis so that the members can be opened or closed relative to each other, a surface of the glass being disposed inside for displaying an image projected from a movie projector, said screen means adapted to be detachably engaged in the frame instead of the plate.

2. The device according to claim 1, wherein said box has a stepped portion, and a fluorescent lamp is mounted on the upper portion of the bottom of the stepped portion.

3. The device according to claim 2, wherein a reflected plate made of silver paper is fixedly secured to the stepped portion of the box.

4. The device according to claim 1, wherein the glass plate of said holder for the photograph or the picture is formed of a transparent glass.

5. The device according to claim 1, wherein the glass of said screen means is formed of ground glass.

* * * * *